United States Patent
Hartman et al.

(12)

(10) Patent No.: US 11,205,073 B2
(45) Date of Patent: Dec. 21, 2021

(54) SYSTEM TO AUTOMATICALLY DETECT AND REPORT CHANGES OVER TIME IN A LARGE IMAGING DATA SET

(71) Applicant: Greensight Agronomics, Inc., Boston, MA (US)

(72) Inventors: Brett A. Hartman, Brighton, MA (US); Kennan G. Arlen, Boston, MA (US); James R. Peverill, Milpitas, CA (US)

(73) Assignee: Greensight Agronomics, Inc., Boston, MA (US)

( * ) Notice: Subject to any disclaimer, the term of this patent is extended or adjusted under 35 U.S.C. 154(b) by 0 days.

(21) Appl. No.: 16/367,871

(22) Filed: Mar. 28, 2019

(65) Prior Publication Data
US 2019/0392211 A1    Dec. 26, 2019

Related U.S. Application Data

(60) Provisional application No. 62/650,810, filed on Mar. 30, 2018.

(51) Int. Cl.
*G06K 9/00* (2006.01)
*G06K 9/74* (2006.01)
(Continued)

(52) U.S. Cl.
CPC ........ *G06K 9/00657* (2013.01); *B64C 39/024* (2013.01); *G05D 1/0094* (2013.01);
(Continued)

(58) Field of Classification Search
CPC .................. G06T 2207/10004; G06T 7/001
(Continued)

(56) References Cited

U.S. PATENT DOCUMENTS 7,184,859 B2   2/2007  Hood et al.
7,610,122 B2   10/2009 Anderson
(Continued)

FOREIGN PATENT DOCUMENTS

DE    202015102833 U1   10/2015
WO    WO 2017/077543 A1  5/2017

OTHER PUBLICATIONS

Bagheri et al., "Multispectral Remote Sensing for Site-Specific Nitrogen Fertilizer Management," Pesquisa Agropecuaria Brasileira, vol. 48, No. 10, pp. 1394-1401, 2013.
(Continued)

*Primary Examiner* — Kiet M Doan
(74) *Attorney, Agent, or Firm* — Patterson Thuente Pedersen, P.A.

(57) ABSTRACT

Systems and methods to analyze visible, near infrared, and thermal imagery of a land parcel in order to track and report changes to that land. A set of image processing techniques and algorithms can be utilized to generate composite images, align the imagery, compute differences, detect which features have changed, and meaningfully display the changed features. A moving window calculates differences in intensity between a first composite image and a second composite image and compares the differences against a threshold value. An interactive overlay user interface allows a user to adjust the magnitude and particular areas to be analyzed and presents the change.

16 Claims, 12 Drawing Sheets

(51) Int. Cl.

| | |
|---|---|
| *G06T 7/246* | (2017.01) |
| *H04N 5/232* | (2006.01) |
| *G06T 7/174* | (2017.01) |
| *G05D 1/00* | (2006.01) |
| *B64C 39/02* | (2006.01) |
| *G06T 11/60* | (2006.01) |

(52) U.S. Cl.
CPC .......... *G06K 9/00671* (2013.01); *G06K 9/74* (2013.01); *G06T 7/174* (2017.01); *G06T 7/248* (2017.01); *G06T 11/60* (2013.01); *H04N 5/23218* (2018.08); *B64C 2201/123* (2013.01); *G06K 2209/17* (2013.01); *G06T 2200/24* (2013.01); *G06T 2207/10016* (2013.01); *G06T 2207/10032* (2013.01); *G06T 2207/20212* (2013.01); *G06T 2207/30188* (2013.01)

(58) Field of Classification Search
USPC ........ 382/100, 219, 306, 131; 348/222.1, 46
See application file for complete search history.

(56) References Cited

U.S. PATENT DOCUMENTS

| | | | |
|---|---|---|---|
| 8,712,148 | B2 | 4/2014 | Paris et al. |
| 9,302,770 | B2 | 4/2016 | Burgess et al. |
| 9,382,003 | B2 | 7/2016 | Burema et al. |
| 9,387,928 | B1 | 7/2016 | Gentry et al. |
| 9,389,298 | B2 | 7/2016 | Smitherman |
| 9,505,494 | B1 | 11/2016 | Marlow et al. |
| 9,519,861 | B1 | 12/2016 | Gates et al. |
| 9,619,776 | B1 | 4/2017 | Ford |
| 9,638,678 | B2 | 5/2017 | Shriver et al. |
| 9,734,400 | B2 | 8/2017 | Shriver |
| 9,756,844 | B2 | 9/2017 | Groeneveld |
| 9,791,316 | B2 | 10/2017 | Ritter et al. |
| 9,792,557 | B2 | 10/2017 | Mathur et al. |
| 9,922,405 | B2 | 3/2018 | Sauder et al. |
| 2009/0271719 | A1* | 10/2009 | Clare ................... G09B 29/007 715/762 |
| 2011/0061764 | A1 | 3/2011 | Springer |
| 2011/0121020 | A1 | 5/2011 | Springer |
| 2012/0101634 | A1 | 4/2012 | Lindores |
| 2013/0118639 | A1 | 5/2013 | Springer |
| 2014/0032034 | A1 | 1/2014 | Raptopoulos et al. |
| 2014/0303814 | A1 | 10/2014 | Burema et al. |
| 2016/0039300 | A1 | 2/2016 | Wang et al. |
| 2016/0048137 | A1 | 2/2016 | Phillips et al. |
| 2016/0050840 | A1 | 2/2016 | Sauder et al. |
| 2016/0086032 | A1 | 3/2016 | Pickett |
| 2016/0133039 | A1 | 5/2016 | Ritter et al. |
| 2016/0144734 | A1 | 5/2016 | Wang et al. |
| 2016/0239709 | A1 | 8/2016 | Shriver |
| 2016/0307448 | A1 | 10/2016 | Salnikov et al. |
| 2016/0328827 | A1* | 11/2016 | Ilic ...................... H04N 5/2624 |
| 2016/0334276 | A1 | 11/2016 | Pluvinage |
| 2017/0129605 | A1 | 5/2017 | Wu et al. |
| 2017/0131254 | A1 | 5/2017 | Shriver et al. |
| 2017/0190260 | A1 | 7/2017 | Wang et al. |
| 2017/0223889 | A1 | 8/2017 | Cavender-Bares |
| 2017/0253349 | A1 | 9/2017 | Wang et al. |
| 2017/0336203 | A1* | 11/2017 | Barnes .................. G01C 11/34 |
| 2018/0099747 | A1 | 4/2018 | Peng et al. |
| 2018/0118340 | A1 | 5/2018 | Russo |
| 2018/0293444 | A1 | 10/2018 | Buoro et al. |
| 2019/0026896 | A1* | 1/2019 | Kluckner ................ G06T 7/70 |
| 2019/0031346 | A1 | 1/2019 | Yong et al. |
| 2019/0066234 | A1 | 2/2019 | Bedoya et al. |
| 2019/0073534 | A1 | 3/2019 | Dvir et al. |
| 2019/0082650 | A1 | 3/2019 | Lepek et al. |
| 2019/0114481 | A1 | 4/2019 | DeChant et al. |
| 2019/0144097 | A1 | 5/2019 | Benson et al. |
| 2019/0265735 | A1 | 8/2019 | Ishikawa et al. |
| 2019/0387687 | A1 | 12/2019 | Nitsch et al. |
| 2019/0389577 | A1 | 12/2019 | Jones et al. |

OTHER PUBLICATIONS

Ball et al., "A Comprehensive Survey of Deep Learning in Remote Sensing: Theories, Tools and Challenges for the Community," Mississippi State University & University of Malaysia, Sep. 2017, 64 pages.
Bedord, "Sentera NDVI Crop Health Maps Show Field Contrast and Progression," Successful Farming, Jan. 2017, 8 pages.
Budde et al., "Agriculture and Food Availability-Remote Sensing of Agriculture for Food Security Monitoring in the Developing World," IFEE Oceanic Engineering Society, Feb. 2010, 10 pages.
Burwood-Taylor, "The Growing Ecosystem of Satellite Imagery for Ag," AFN, Mar. 2016, 11 pages.
Chao et al., "AggieAir: Towards Low-Cost Cooperative Multispectral Remote Sensing Using Small Unmanned Aircraft Systems," Advances in Geoscience and Remote Sensing, www.itechopen.com, Oct. 2009, 29 pages.
Chew, "Early Detection of Plant Disease Using Close Range Sensing System for Input into Digital Earth Environment," 8th International Symposium of the Digital Earth (ISDE8), 2014, 6 pages.
De Castro Victoria, "Cropland Area Estimates Using Modis NDVI Time Series in the State of Mato Grosso, Brazil," Pesq. Agropec. Bras., Brasilia, v47, n9, 2012, p. 1270-1278.
De Filippis et al., "A WebGIS Application for Precision Viticulture: From Research to Operative Practices," WebMGS 2010, ISPRS Conference, XXXVIII/4-W13, Jan. 2010, 7 pages.
Earth Observatory, "Measuring Vegetation (NDVI & EVI), NDVI as an Indicator of Drought," NASA, Aug. 2000, 3 pages.
Getahun Tadesse Kabthimer, "Assessment of Spatio-Temporal Patterns of NDVI in Response to Precipitation Using NOAA-AVHRR Rainfall Estimate and NDVI Data From 1996-2008, Ethiopia," 2012, 41 pages.
Hatfield et al., "Application of Spectral Remote Sensor for Agronomic Decisions," Agron J., vol. 100, No. Supplement 3, p, S-117, 2008, 16 pages.
Kassa, "Drought Risk Monitoring for the Sudan Using NDVI," University College London, Aug. 1999, 47 pages.
Khan et al., "Forest Change Detection in Incomplete Satellite Images with Deep Neural Networks," IHEE Transactions on Geoscience and Remote Sensing, vol. X, No. X, Aug. 2016, 17 pages.
Leilei et al., "The Relationship Analysis of Vegitation Cover, Rainfall and Land Surface Temperature Based on Remote Sensing in Tibet, China," IOP Conf. Series: Earth and Environmental Science 17, 2014, 7 pages.
McKellip et al., "Crop Surveillance Demonstration Using a Near-Daily MODIS Derived Vegetation Index Time Series," Computer Sciences Corporation, Mar. 2005, 5 pages.
Sun et al., "Daily Mapping Of 30 m LAI and NDVI for Grape Yield Prediction in California Vineyards," Remote Sens., 2017, 18 pages.
Tiedje, Daily Satellite Imagery Creates Crop Monitoring Tool, Illinois Farmer Today, Oct. 2017, 5 pages.
Toksoz et al., "Automated Battery Swap and Recharge to Enable Persistent UAV Missions," American Institute of Aeronautics and Astronautics, 2011, 10 pages.
Wu et al., "Monitoring Cotton Root Rot by Synthetic Sentinel-2 NDVI Time Series Using Improved Spatial and Temporal Data Fusion," Scientific Reports, Jan. 2018, 12 pages.
Xiang et al., "Deep Learning in Remote Sensing: A Review," IEEE Geoscience and Remote Sensing Magazine, Oct. 2016, 60 pages.
Yamaha Motor Co., Ltd., "Yamaha Motor to Exhibit the New YMR-01 Industrial Drone at Next Generation Agriculture Expo Tokyo, New Coaxial Rotos Provide Excellent Agrochemicals Spraying Performance," Oct. 10, 2017, 2 pages.
Zhu et al., "Deep Learning in Remote Sensing: A Review," IEEE Geoscience and Remote Sensing Magazine, Oct. 2017, 60 pages.
Application and File history for U.S. Appl. No. 16/367,783, filed Mar. 28, 2019. Inventors: Jones et al.
Application and File history for U.S. Appl. No. 16/367,835, filed Mar. 28, 2019. Inventors: Nitsch et al.

\* cited by examiner

SYSTEM TO AUTOMATICALLY DETECT AND REPORT CHANGES OVER TIME IN A LARGE IMAGING DATA SET

CROSS-REFERENCE TO RELATED APPLICATIONS

This application claims the benefit of U.S. Provisional Application No. 62/650,810 filed Mar. 30, 2018, and is related to U.S. Patent Application No. 62/650,796 filed on Mar. 30, 2018, each of which are hereby fully incorporated herein by reference.

TECHNICAL FIELD

Embodiments relate generally to image analysis. More particularly, embodiments relate to systems and methods for identifying changes on a parcel of land using remotely-sensed data.

BACKGROUND

Various systems and methods are known for providing one-time images, sensor maps, and other data about land and its contents at narrow moments in time. Examples include photographs taken by spacecraft and manned aircraft, hand-held radiometer measurements, and data obtained by individual visits by unmanned vehicles.

Such conventional solutions are satisfactory for their rudimentary purposes. However, most land managers and owners are more interested in the changes that occur to land and its contents over time, rather than a particular state of the land at one moment in time. For instance, farmers want to see the onset and growth of disease or pests, as well as detect increases and decreases in the soil moisture levels of fields. Construction managers want to see the state of site preparation and construction progress. Forest managers want to see the arrival of disease, physical damage, or fire. Ranchers want to monitor the number, location, and health of animals in fields over time. Homeowners associations want to identify modifications to houses or yards. Military planners want to detect and track movements of supplies, units, and equipment in a local area and detect traps or improvised explosive devices. Thus, conventional solutions do not satisfy users' needs because they take simple "snapshots" at a moment in time, rather than monitoring and identifying changes.

Basic change detection solutions exist. For example, the academic paper, "Automatic analysis of the difference image for unsupervised change detection," authored by L. Bruzzone and D. F. Prieto, describes two automatic techniques based on the Bayes theory for the analysis of image differences. (*IEEE Transactions on Geoscience and Remote Sensing*, Vol. 38, No. 3, May 2000.) However, these techniques require extensive processing capabilities. Further, the disclosure is silent as to any generation of a composite image from a set of individual images.

In another example, the academic paper, "Image change detection algorithms: a systematic survey," authored by R. J. Radke, S. Andra, O. Al-Kofahi, and B. Roysam, discloses a survey of the common processing steps and core algorithms for detecting regions of change in images of the same scene. (*IEEE Transactions on Image Processing*, Volume: 14, Issue: 3, March 2005.) However, this disclosure is also silent as to any generation of a composite image from a set of individual images.

In another example, the academic paper, "Object-based classification of remote sensing data for change detection," authored by Volker Walter, discloses a change detection approach based on an object-based classification. The approach classifies not single pixels but groups of pixels that represent already existing objects in a GIS database. (*ISPRS Journal of Photogrammetry & Remote Sensing* Vol. 58, pp. 225-238, 2004.) However, this solution requires a database of existing objects. Further, the disclosure is silent as to any generation of a composite image from a set of individual images.

In another example, the academic paper, "Unsupervised Change Detection in Satellite Images Using Principal Component Analysis and k-Means Clustering," authored by Turgay Celik, discloses image partitioning into overlapping blocks and change detection by partitioning the feature vector space into two clusters using k-means clustering. (*IEEE Geoscience and Remote Sensing Letters*, Vol. 6, No. 4, October 2009.) However, these techniques require extensive processing capabilities. Further, the disclosure is again silent as to any generation of a composite image from a set of individual images.

Satellite imaging analysis and aerial imaging analysis techniques have long been known. For example, U.S. Pat. Nos. 9,791,316; 9,389,298; and 8,712,148 describe such systems.

Likewise, some image deviation, vegetation analysis, and treatment actions are also known. For example, U.S. Patent Application Pub. No. 2016/0086032, entitled, "Method and system for collecting image data," describes determining a deviation of crop image analysis with respect to an expected mean/average.

International Patent Application Pub. No. WO2017077543, entitled, "A method for aerial imagery acquisition and analysis," describes a two-stage aerial image acquisition of vegetation according to predefined survey parameters based on blob analysis to selectively obtain higher resolution imagery in the second stage.

U.S. Pat. No. 9,638,678, entitled, "System and method for crop health monitoring," and U.S. Pat. No. 9,734,400, entitled, "System and method for field variance determination," describe crop health anomalies identified based on an expected geographic sub-region analysis.

U.S. Pat. No. 9,756,844, entitled, "Method and system to map biological pests in agricultural fields using remotely-sensed data for field scouting and targeted chemical application," describes generating poor performing areas of fields based on earth observation satellite data when compared to crop performance reflectance data.

U.S. Pat. No. 9,792,557, entitled, "Precision agriculture system," describes creating a model based on farm sensor data and providing alerts or actions in response to the model.

Various other systems have been described in patents and patent applications relating to application of agricultural chemicals based on remotely-sensed data such as those described in U.S. Pat. Nos. 7,184,859; 9,382,003; and 9,922,405 and U.S. Patent Application Pub. Nos. 2014/030381, 2016/0334276, 2016/0133039

However, these descriptions do not offer solutions needed for golf courses and similar areas due to the vegetation differences, as well as the environment having both dynamic and static objects.

Therefore, there is a need for efficient and economic systems and methods for effectively generating composite images and monitoring changes in land and its contents over time based on the composite images.

SUMMARY

Embodiments substantially solve the aforementioned problems of the industry. In particular, systems and methods are configured to analyze visible, near infrared, and thermal imagery of a land parcel in order to track and report changes to that land. Embodiments can utilize a set of image processing techniques and algorithms to align imagery, compute differences, and detect which features have changed.

In an embodiment, a system for detecting changes in an agricultural area comprises a remote imaging device configured to capture data related to the agricultural area in a first image and a second image captured at a first time and a third image and a fourth image captured at a second time; data storage configured to store the first image, the second image, the third image, and the fourth image; an analysis engine comprising instructions that, when implemented by a processor operably coupled to memory, cause the processor to compile the first image and the second image into a first composite image, compile the third image and the fourth image into a second composite image, and detect at least one change between the first composite image and the second composite image with a moving window that calculates differences in intensity between the first composite image and the second composite image and compares the differences against a threshold value; and a display engine comprising instructions that, when implemented by a processor operably coupled to memory, cause the processor to generate an interactive overlay user interface that presents the at least one change, wherein the interactive overlay comprises at least one adjustable threshold user interface element allowing a user to adjust the magnitude of the at least one change displayed.

In an embodiment, a method for detecting changes in an agricultural area comprises capturing data related to the agricultural area in a first image and a second image captured at a first time and a third image and a fourth image captured at a second time; storing in data storage, the first image, the second image, the third image, and the fourth image; compiling the first image and the second image into a first composite image; compiling the third image and the fourth image into a second composite image, and detecting at least one change between the first composite image and the second composite image with a moving window that calculates differences in intensity between the first composite image and the second composite image and compares the differences against a threshold value; and generating an interactive overlay user interface that presents the at least one change, wherein the interactive overlay comprises at least one adjustable threshold user interface element allowing a user to adjust the magnitude of the at least one change displayed.

In an embodiment, a system for analyzing changes on a golf course comprises a remote imaging device configured to capture data related to the golf course in a first image and a second image captured at a first time and a third image and a fourth image captured at a second time; data storage configured to store the first image, the second image, the third image, and the fourth image; an analysis engine comprising instructions that, when implemented by a processor operably coupled to memory, cause the processor to: pre-process at least one of the first image, the second image, the third image, or the fourth image to remove at least one fixed golf course artifact from the images; pre-process at least one of the first image, the second image, the third image, or the fourth image to remove at least one transient golf course artifact from the images; a display engine comprising instructions that, when implemented by a processor operably coupled to memory, cause the processor to: generate a user interface configured to receive selection of a first region within at least one of the first image, the second image, the third image, or the fourth image to be analyzed at a first resolution and selection of a second region within at least one of the first image, the second image, the third image, or the fourth image to be analyzed at a second resolution; wherein the analysis engine further comprises instructions that, when implemented by a processor operably coupled to memory, cause the processor to: compile the first image and the second image into a first composite image without the at least one fixed golf course artifact and the at least one transient golf course artifact, compile the third image and the fourth image into a second composite image without the at least one fixed golf course artifact and the at least one transient golf course artifact, and detect at least one change between the first composite image and the second composite image based on the first resolution and the second resolution.

In a feature and advantage of embodiments, systems and methods described herein provide a higher level of detail over a larger area than existing solutions. Typically, when a camera captures an image of the ground, there is a tradeoff between the level of detail obtained, and the amount of ground covered by the image. By first processing many individual images taken at different points into a single composite image, the system is able to provide a high level of detail over a much larger area than processing single images for differences.

In another feature and advantage of embodiments, systems and methods process imagery in three stages. In a first stage, raw imagery is processed into a form in which change detection can be conducted. In embodiments, this includes image alignment and registration, then feature detection and segmentation. In a second stage, the system detects regions or features on the land that have changed over a given time period. In embodiments, this includes image delta calculations and noise filtering. In a third stage, the system presents the output to a user. In embodiments, this unique reporting creates an interactive overlay that highlights changes and allows the user to quickly adjust what information is displayed. In embodiments, change thresholds offer smaller or larger changes to be displayed. Further, automatic alerts can be transmitted if a change is above a certain threshold and/or in a certain portion of the land being imaged.

Moreover, in another feature and advantage of embodiments, systems and methods provide solutions for image detection that are unique to golf courses. Golf courses present a unique challenge in change detection compared to agricultural crop environments because there is no growing of crops to maturity. Rather, grass and similar plants are simply maintained.

Further, in contrast to the typically static crop environment, golf courses are a dynamic environment with continuous environmental and temporal movement by people, golf carts, and maintenance equipment. Golf courses also have golf course artifacts like flags, tee box markers, yardage markers, irrigation heads, and the like. Accordingly, the user interface allows the user to select areas to analyze and can be pre-defined with varying levels of resolution for particular areas. For example, a user may want to ignore a pond, but have a high level of resolution on the greens, ignoring movement of flag position and golfers walking on the greens.

In another feature and advantage of embodiments, semantic segmentation described herein has a number of applications that aid in the problem of change detection in aerial images. As an initial matter, semantic segmentation can be used at a high level to aid in dividing the image into regions that are of interest and those that are not. For regions that are of interest, semantic segmentation is useful in classifying putting greens, fairways, rough, sand bunkers, trees, and other objects such as roads and buildings. This enables the selective application or filtering of potential diseases or afflictions that may be detected by change detection algorithms. For example, it is not desirable to detect a vegetation disease such as dollar spot on non-agriculture surfaces such as roads or buildings. Thus, using the results of semantic segmentation classification to only apply detection algorithms to agriculture areas saves on both processing time and reduces the possibility of false positives.

In another feature and advantage of embodiments, the systems and methods for change detection described herein are not limited to just semantic segmentation, but more broadly deep learning methods in general. In an embodiment, predictive deep learning models can predict future images based on prior ones. In that example, a future prediction might be taken as the "ground truth," and a newly acquired "real" image can be used to measure deviance from the prediction. If there has not been much fluctuation, the predicted image would be very similar to the past days of images. If a disease occurs and becomes visible between imaging sessions, the new image would deviate in appearance (or measured plant health metric) over the affected portion.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
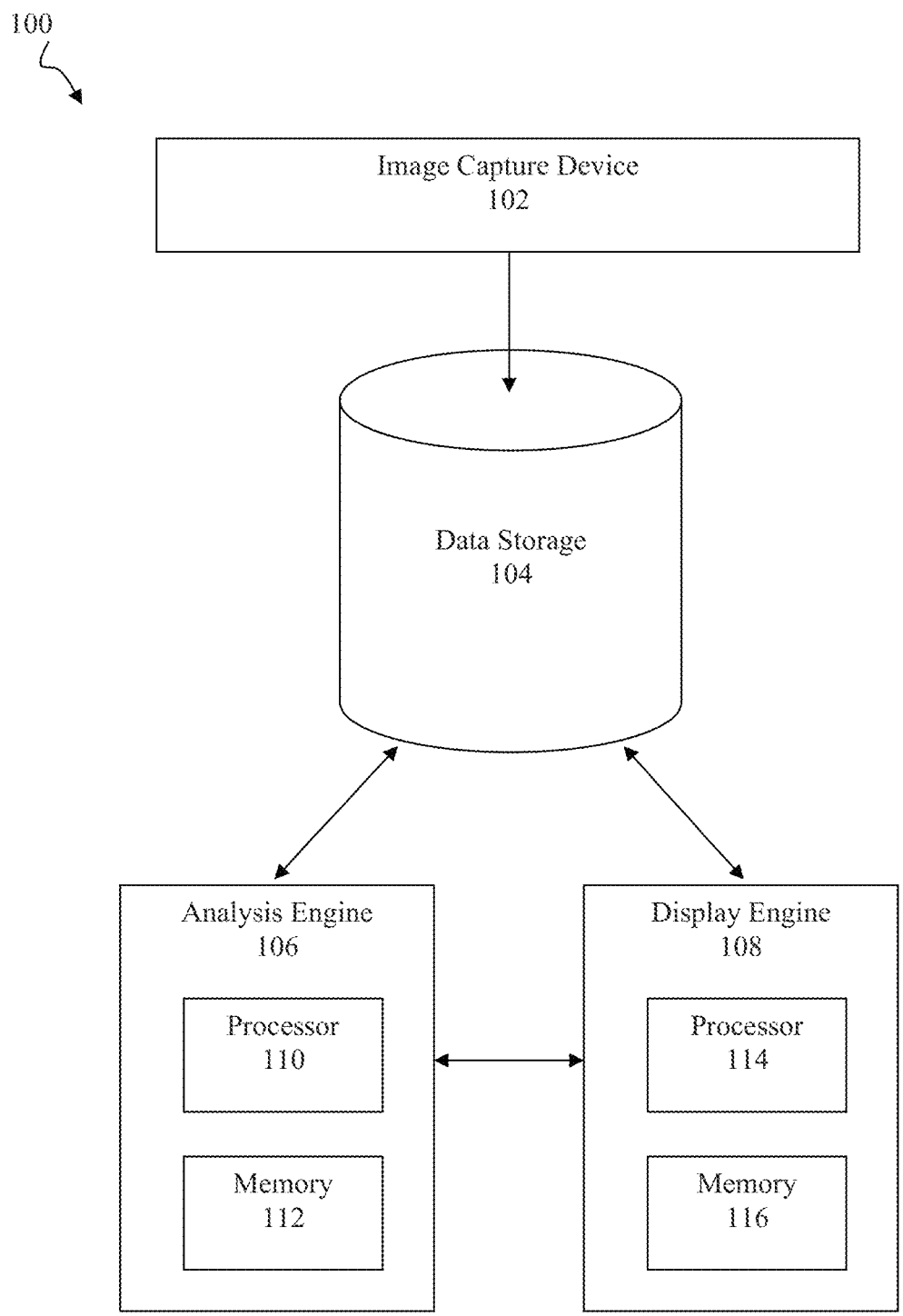
FIG. 1 is a block diagram of a system for automated image change detection, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for automated image change detection is depicted, according to an embodiment. System 100 generally comprises an image capture device 102, data storage 104, an analysis engine 106, and a display engine 108.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of system 100, and the corresponding methods of configuring and operating the system 100, can be performed in cloud computing, client-server, or other networked environments, or any combination thereof. The components of the system can be located in a singular "cloud" or network, or spread among many clouds or networks. End-user knowledge of the physical location and configuration of components of the system is not required. For example, as will be described, data storage 104, analysis engine 106, and display engine 108 can be combined as appropriate to share hardware resources, if desired.

Image capture device 102 generally comprises an apparatus for remotely sensing data related to an area of land. In an embodiment, image capture device 102 can comprise a UAV having one or more sensors for capturing data proximate the flight path of the UAV. For example, UAV can include an integrated imaging camera, thermal camera, or infrared camera. In an embodiment, the UAV can comprise two or more of the aforementioned remote cameras. In embodiments, system 100 can further comprise remote ground-based sensors configured to capture similar visible, near infrared, or thermal imagery, such as a camera positioned on a stationary mounted position such as on a pole, or a land-based vehicle or other apparatus providing relative height above the ground. In embodiments, satellite-based imagers can also be utilized. Embodiments are therefore able to utilize imagery from myriad imaging sources that might be available to users.

In an embodiment, challenges in utilizing land-based camera data with aerial camera data can be solved by systems and methods described herein. For example, when integrating land-based camera data with aerial camera data, solutions account for the generally ortho-normal aerial camera data and the typically non-ortho-normal pole-mounted camera data. Image stitching or composite image generation accounts for the difference in imaging angle. In other embodiments, land-based camera data and aerial camera data is not integrated together into a composite image. Rather, each image can be utilized as a separate layer in, for example, an agricultural raster data cube.

In embodiments, image capture device 102 can capture data that is georeferenced such that an internal coordinate system of a map or aerial photo image is related to a ground system of geographic coordinates. The relevant coordinate transforms can be stored within the image file captured.

In an embodiment, a controller for image capture device 102 can be integrated with the controller for the UAV such that images are automatically captured along a flight path. For example, a drone can be flown at varying altitudes and patterns. For areas that are not of interest or importance, the drone is commanded to fly at high altitude. During flight, a time-based, proximity-based, or location-based sensor can detect that the drone is flying to a region of interest and automatically inform the controller to command the drone to a low altitude. Once the region of interest has been captured at a low altitude, the drone can be commanded back to high altitude. In other embodiments, the capturing of images can be remotely commanded by a user during the flight.

Image capture device 102 is configured to temporarily store the captured data and transmit the data to data storage 104. In another embodiment, image capture device 102 can transmit the data to an intermediary device (not shown), which can transmit the data to data storage 104.

Data storage 104 generally comprises electronic storage for storing images captured by image capture device 102. In an embodiment, data storage 10 can be a general-purpose database management storage system (DBMS) or relational DBMS as implemented by, for example, Oracle, IBM DB2, Microsoft SQL Server, PostgreSQL, MySQL, SQLite, Linux, or Unix solutions, in embodiments. Accordingly, SQL calls can be utilized for storage and retrieval. In another embodiment, data storage 104 can comprise the unique data cube storage specified in related application "AUTOMATED OPTIMIZATION AGRICULTURAL TREATMENTS BASED ON RASTER IMAGE DATA SYSTEM," incorporated by reference above. In another embodiment, data storage 104 can comprise Amazon Web Services (AWS) cloud computing service.

Analysis engine 106 is configured to analyze the images captured by image capture device 102 and determine a changed region or feature. As illustrated in FIG. 1, analysis engine 106 generally includes a processor 110, a memory 112, and instructions executable on the processor to receive a plurality of raw images, generate at least two composite images from the raw images, and detect a region or feature that has changed in the multiple composite images.

Processor 112 can be any programmable device that accepts digital data as input, is configured to process the input according to instructions or algorithms, and provides results as outputs. In an embodiment, processor 110 can be a central processing unit (CPU) configured to carry out the instructions of a computer program. Processor 112 is therefore configured to perform at least basic arithmetical, logical, and input/output operations.

Memory 114 can comprise volatile or non-volatile memory as required by the coupled processor 112 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Display engine 108 is configured to process the output of analysis engine 106 and uniquely display the results. In an embodiment, analysis engine 106 generally includes a processor 114, a memory 116, and instructions executable on the processor to receive the output of analysis engine 106 and create an interactive display that highlights the changes in the composite images. In embodiments, processor 114 and memory 116 can be respectively substantially similar to processor 110 and memory 112 described above. In another embodiment, analysis engine 106 and display engine 108 can share a processor and memory, for example, processor 110 and memory 112, such that the engines 106 and 108 do not need their own separate instances of a processor and memory.

In embodiments, display engine 108 uniquely displays the changed region or feature. In an embodiment, a stress vector from related application "AUTOMATED OPTIMIZATION AGRICULTURAL TREATMENTS BASED ON RASTER IMAGE DATA SYSTEM" can be displayed. In another embodiment, a knob and slider bar can be utilized. For example, graphical knobs controlling the duration of the dwell period and degree of change can be presented. Slider bars controlling the relative proportions of the kinds of change the user wishes to be displayed are likewise presented. In an embodiment, user parameters can therefore adjust the severity of what is being shown and the kinds of change being displayed. The underlying dataset (source imagery) retains its pixels of a certain dimension according to the composite image, but the user interface to view these pixels at varying levels is thus controlled.

The goal of display engine 108 is to present the change detection in relation to the underlying scene without overwhelming the user with massive amounts of data. In one embodiment, machine learning is utilized to "learn" interesting changes. In other words, an algorithm can be trained to learn the changes users are typically interested in as well as the changes users might not typically be interested in.

Land areas typically have a lot of changes that are considered "normal" changes. Embodiments of analysis engine 106 and display engine 108 are configured to detect and display the changes rising to the level above "normal." For example, consider the insignificant changes of leaves falling from trees onto the ground or the sun illuminating the ground at different intensities as it rotates around the land area. Embodiments are configured to eliminate the "background noise" changes such as the leaves appearing at different levels. In embodiments, using data from multiple cameras as part of the image alignment helps filter such background noise changes. A normalization step described herein can similarly account for light level changes.

Figure 2:
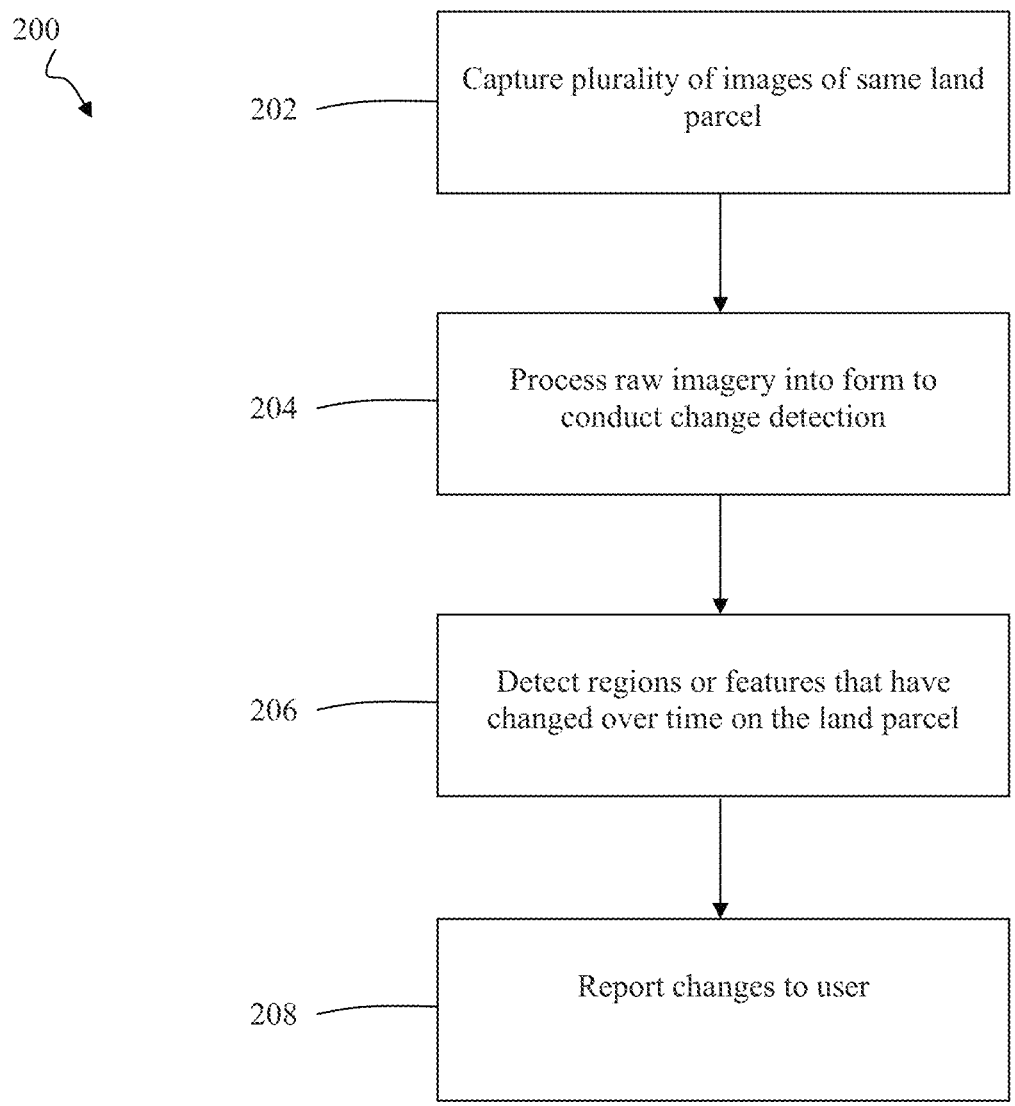
FIG. 2 is a flowchart of a method for automated image change detection, according to an embodiment.

Referring to FIG. 2, a flowchart of a method 200 for automated image change detection is depicted, according to an embodiment. Method 200 can be implemented by system 100, for example. Method 200 describes the basic steps in automated image change detection. Each of these basic steps are further illustrated and described with respect to FIGS. 3-9.

Method 200 generally comprises capturing a plurality of images of the same land area at 202. For example, image capture device 102 can capture a raster image over a particular agricultural area. In an embodiment, a second image capture device can capture another raster image incorporating different image data for the same agricultural area. Embodiments can command image capture device 102 to capture images at a first time and again at a later second time. For example, a UAV can conduct one flight over a golf course on Monday morning and another flight over the golf course on Tuesday afternoon.

The controlled periodicity of image capture provided by the system allows embodiments to detect transient issues more effectively than traditional solutions. The higher frequency sampling and subsequent ability to detect transient issues are two features that set the invention apart from traditional satellite or helicopter imaging.

For example, not all areas in an area of land will have the same change detection priority. Consider the above golf course example in which the greens might have higher importance than the fairways, which might have higher importance than the rough. It is very important to detect any issues on the greens (such as changing agricultural conditions like disease states or localized flooding), which can affect the ability of a golf course to be played. In one embodiment, imagery of the greens might be generated on a daily or multiple-time-per-week basis, while imagery of the fairways and rough might be generated on a weekly basis. For example, a UAV can be programmed for a flight mission with image capture device 102 to capture all the greens on the golf course every morning. A UAV can be programmed for a flight mission with image capture device 102 to capture the fairways and rough as part of the first data capture of the greens for the week.

In an embodiment, controlled periodicity can be combined with altitude adjustment to favor high priority areas. For example, a UAV can be programmed for a flight mission with image capture device 102 for relatively low altitude data capture for the greens, and relatively high altitude data capture for the fairways and rough. Capturing this type and frequency of images allows for the ability to find transient issues.

Fundamentally, at 202, at least two images of the same land parcel are captured at different times. In embodiments, multiple images at a first time and multiple images at a second time for the same land parcel are captured.

In an embodiment, a preferred imaging frequency is five days per week. In an embodiment, a maximum imaging frequency is twice per day, and a minimum imaging frequency is three times per week. In an embodiment, imaging can be conducted at any light exposure.

High frequency sampling provided by UAVs described herein has numerous benefits over traditional less frequent imaging (e.g. weekly, bi-weekly, or lower frequency imaging flights). For example, satellite systems typically do not support this frequency of accurate image data at the consumer level. Some satellite systems do capture daily data, but typically do not have high spatial resolution and are negatively affected by things like cloud cover or haze.

Further, some diseases can spread on turf extremely fast. For example, Pythium blight on golf courses can cause acres of death in less than 24 hours. In another example, a particular disease with a 7-day incubation period might be detectable earlier than visible symptoms show. Alerting the user earlier than visible symptoms appear offers earlier treatment options resulting in potentially fewer chemicals used.

In one embodiment, daily flights offer a much higher resolution in temporal health data. This allows decreased sensitivity to noise or aliasing. Moreover, without high frequency imaging (e.g. daily or 5× per week), a lot of information is lost, as minute changes in measurements such as NDVI can be large contributors to changes in plant health. In summary, plant health can modulate fast and systems and methods described herein can capture those changes. Further, water management similarly benefits from a more frequent imaging. As an example, irrigation head malfunctions can be detected earlier. Further, golf-course specific concerns can be solved with more frequent imaging. Detections of fairway shrink or greens creep can be identified before the problem is unmanageable. Further, different parts of course are mowed at different rates and such imaging aids in playability decisions of the course.

It is beneficial with respect to the quality of data for temperature and weather measurements to increase flight frequency. Otherwise, a flight taking place on a single hot day within a cool mid-summer week would mischaracterize the temperature trends of that week. More specifically, when weather/temperature patterns are largely sinusoidal (more often temperature than weather), flying more often allows sampling to approach the Nyquist Frequency.

Method 200 further comprises processing the raw imagery into a form to conduct change detection at 204. For example, image capture device 102, via a wired or wireless connection through the drone or other mounting device, can upload its images to data storage 104. Analysis engine 106 can retrieve the stored raw images and process the raw images into a form in which change detection can be conducted. In embodiments, this includes image alignment and registration to generate a composite image, then feature detection and segmentation between composite images.

Method 200 further comprises detecting regions or features that have changed over time on the land parcel at 206. For example, analysis engine 106 can conduct image delta calculations and noise filtering.

Method 200 further comprises reporting the changes to the user at 208. For example, display engine 108 can generate an interactive overlay that highlights changes and allows the user to quickly adjust what information is displayed. Embodiments are therefore configured to detect and report changes using a large image data set.

Figure 3:
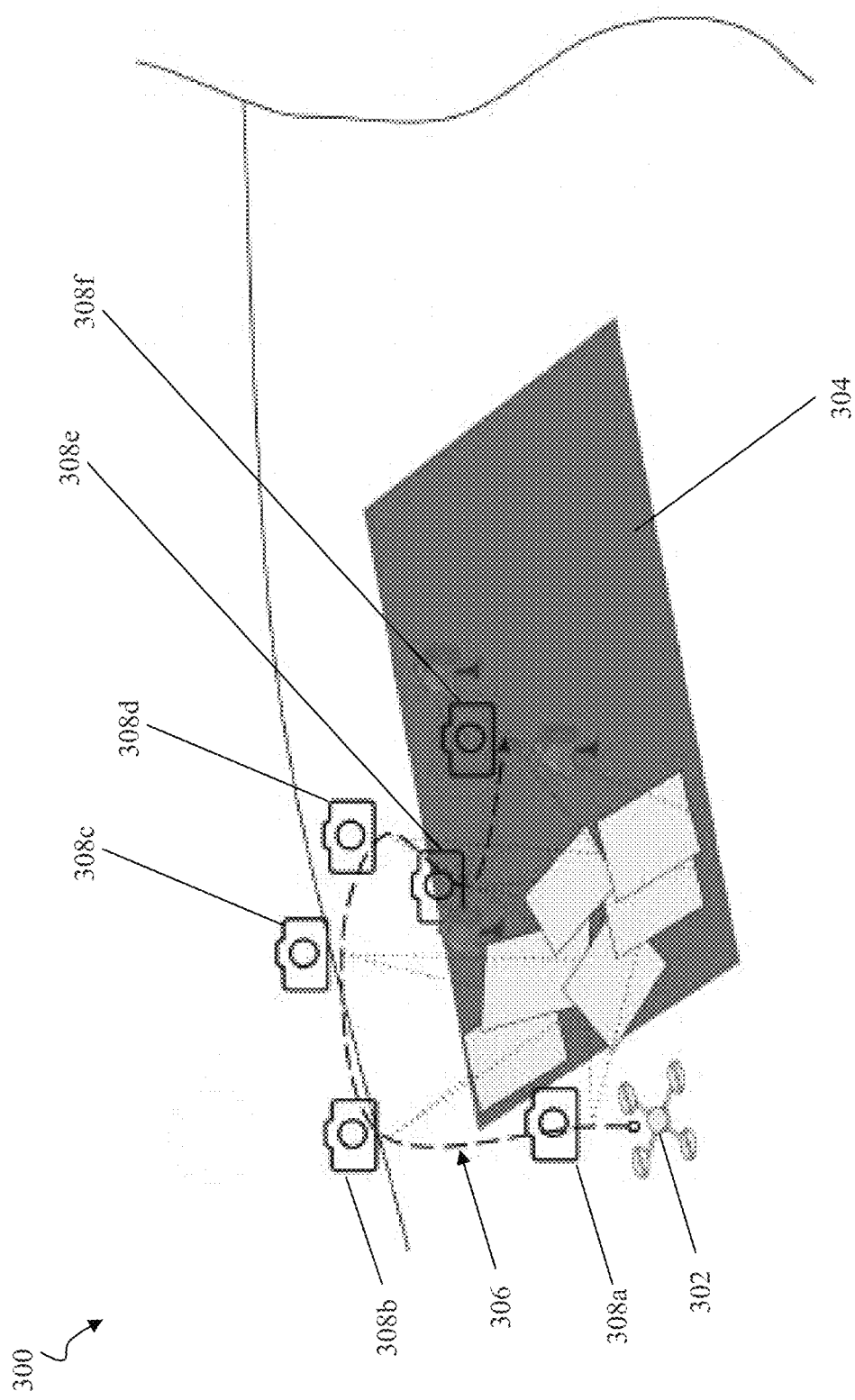
FIG. 3 is a perspective view illustration of an unmanned aerial vehicle flight path as part of a system for automated image change detection, according to an embodiment.

Referring to FIG. 3, a perspective view illustration 300 of an unmanned aerial vehicle or drone 302 flight path is depicted, according to an embodiment. Illustration 300 generally depicts a UAV or drone 302 flying over a land parcel 304 in flight path 306. Drone 302 is depicted as travelling in a non-linear flight path and conducting imaging at positions 308a-308f. As illustrated, images of land parcel 304 can be taken at varying overlap, angle, and altitude with respect to each other. As will be appreciated by one skilled in the art, images can be captured from any platform; aerial drone 302 is just one potential source. In another embodiment (not shown), drone 302 can fly in a linear or grid-type manner. However, it is the ability of the system to conduct subsequent alignment and registration that allows the flexibility in imaging, whereby images can overlap, be angled relative to one another, and can be at varying altitudes and levels of resolution.

In an embodiment, drone 302 platform includes increased endurance and a better set of camera payloads than traditional drones. Thus, a larger area of land with a greater spectrum of cameras can be covered. For example, image capture device 102 is integrated with drone 302 to be lighter and operate longer than existing solutions. In the golf course example above, land parcel 304 can comprise an 18-hole golf course and drone 302 is configured to capture the entire golf course in a single flight. This offers a significant advantage to golf course operators because the drone does not need to go back to base to recharge. Similarly, the golf course operator does not need to use multiple drones or coordinate handoff between drones.

In an embodiment, a flight time for an entire 18-hole golf course is approximately 30-45 minutes (less than 1 hour). In an embodiment, an imaging payload of the UAV comprises three cameras—visible, IR, and thermal. In another embodiment, an imaging payload of the UAV comprises a fourth camera having a specialized visible band. For example, a color filter within the yellow spectrum can detect certain fungus before the human eye can see it.

In one embodiment, a drone platform is capable of the following metrics:
Flight time: 45 min
Flight speed: 10 m/s
Flight distance: 27 km
Raw imagery processed per flight: ~6.98 GB
Raw imagery processed per week (5 flights/week): 34.90 GB
Raw imagery processed per month (20 flights/month): 139.60 GB
Resolution at 100 m flight altitude: 37.04 pixels/meter
Resolution at 40 m flight altitude: 92.60 pixels/meter
Land coverage per 30 min of flight time: ~128-200 acres These values are shown by way of example only and are not intended to limit the disclosure in any way. The data provided per 30 minutes of flight time assumes image overlap in both directions, with approximately 75% image overlap in the direction of motion, flying in a raster flight pattern.

Drone embodiments can achieve a flight time of 45 minutes on a single battery charge. In order to capture clear, blur-free imagery, the typical flight speed for the drone is approximately 10 m/s. This equates to 27 km traveled per flight.

As mentioned above, an imaging payload can include 3 cameras, including two CANON cameras and one thermal camera: one CANON captures imagery from the visible spectrum, the other from the near-infrared (NIR) spectrum. The camera payload is set to trigger approximately every 3 seconds, and each full sized JPEG captured by one of the cameras is ~3.5 MB, while each PNG captured by the thermal camera is ~0.75 MB. At this rate, for a 45 minute flight, up to 900 images per camera are captured. With two Canons and one thermal camera, a total of ~6.98 GB of raw imagery per flight is taken.

In an embodiment of 5 flights per week, for an average of 20 flights per month, a total of 34.90 GB/week or 139.60 GB/month of image data is processed.

In an example image resolution, in pix/m, at a given flight altitude is determined by the formula:

$$\text{resolution} = (\text{focal\_length} * px\_x) / (\text{altitude} * \text{sensor\_dimx})$$

Where focal_length is the focal length of the camera in mm, px_x is the width of the image in pixels, altitude is the flight altitude in m, and sensor_dimx is the width of the camera sensor in mm.

For a CANON Powershot A4000 or similar imaging device used in an example imaging payload, focal_length=5.0 mm, px_x=4608 pixels, and sensor_dimx=6.22 mm. The resolution of a given image with a GSA payload is therefore dependent on the flight altitude: at a typical altitude of 100 m, the resolution is 37.04 pix/m. At a lower flight altitude of 40 m, the resolution is 92.60 pix/m.

This provides a total imaging area of 0.0116 km$^2$/image=2.868 acres/image. For a 900 image flight, the total ground area captured is 10.447 km$^2$/flight=2581.481 acres/flight. However, due to image overlap necessary for effective stitching, the actual unique captured area is smaller.

Assuming image overlap is such that each image contains ~900 m$^2$ of unique features not seen in any other image (~75% overlap in the direction of motion), and the flight plan follows a raster pattern over a square region of land, the total unique area covered by a flight's worth of imagery, per 30 min of flight time, is 0.5184 km$^2$=128.099 acres.

Figure 4:
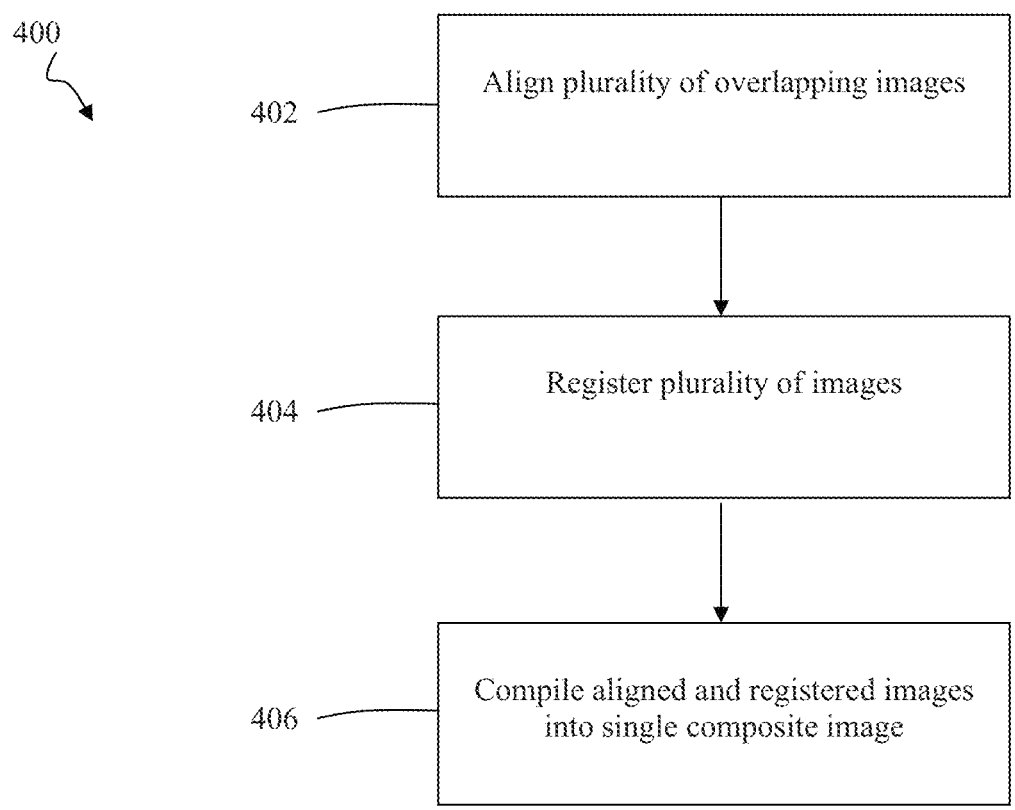
FIG. 4 is a flowchart of a sub-method for image alignment and registration, according to an embodiment.
Figure 5:
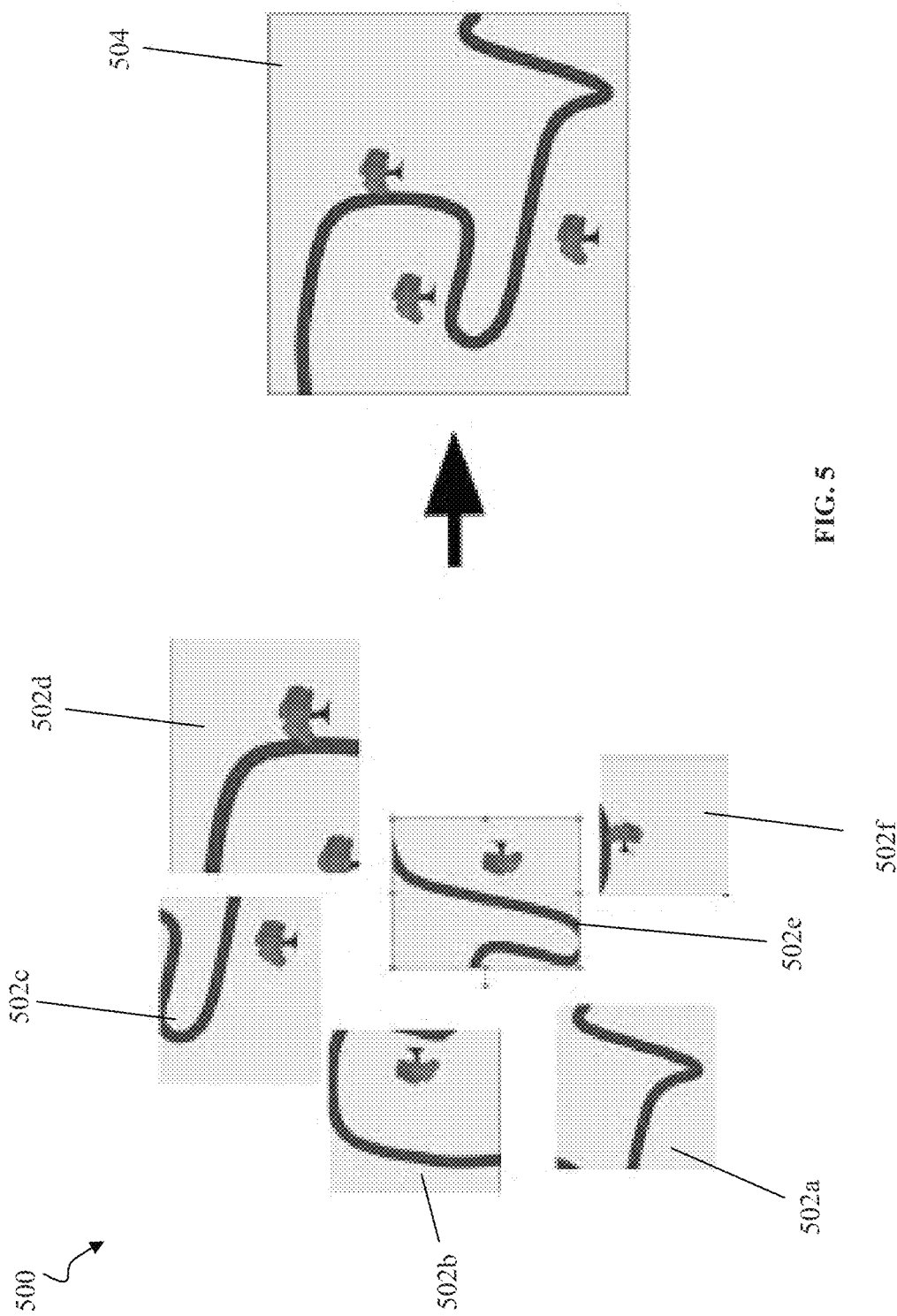
FIG. 5 is a block diagram illustration of a composite image generated from a set of individual images using the sub-method of FIG. 4, according to an embodiment.

Referring to FIG. 4, a flowchart of a sub-method 400 for image alignment and registration is depicted, according to an embodiment. For example, analysis engine 106 is configured to align, register, and compile a first set of individual overlapping images, taken at varying altitudes and angles and stored in data storage 104, into a single first larger composite image. Analysis engine 106 is further configured to align, register, and compile a second set of individual overlapping images, taken at varying altitudes and angles and stored in data storage 104, into a single second larger composite image.

In particular, sub-method 400 generally comprises first aligning a plurality of overlapping images at 402. As illustrated in FIG. 3, images taken at a first time period can comprise sections that are shared with other images. In another example, referring to FIG. 5, a block diagram illustration 500 of a composite image generated from a set of individual images using sub-method 400 is depicted, according to an embodiment. Illustration 500 generally comprises individual overlapping images 502a-502e. In this example, images 502a and 502e share portions of the river depicted. Likewise, images 502c and 502d share portions of trees and river.

At 402, the overlapping images are aligned using GPS location, ground-location marking, or other suitable image metadata. In an embodiment, alignment can be conducted using a histogram of oriented gradients (HOG) by counting occurrences of gradient orientation in localized portions of an image.

At 404, a plurality of images taken over a common time period are registered against each other. In particular, the plurality of images are transformed into a single coordinate system for the composite image. In an embodiment, image registration can include spatially transforming a source or moving image to align with a target image.

At 406, the aligned and registered images for the common time period are compiled into a single composite image. For example, referring again to FIG. 5, composite image 504 is generated. In embodiments, aligned and registered images for a second common time period are compiled into a second single composite image. In embodiments, the composite images are stored in data storage 104.

In an example, alignment and registration workflow can be as follows. First, raw imagery is captured from a vehicle using multiple cameras, each capturing a separate spectrum (e.g. visible, near-infrared (NIR), thermal).

Next, images from different cameras are aligned to one another to remove offsets resulting from physical offsets of cameras on imaging payload, image capture delays, FOV variations, etc.

Next, images from the visible camera are stitched together into a single map by, for example, matching features between nearby images, creating a dense point cloud from matched features, generating a mesh from the point cloud, texturing the mesh using captured imagery, georeferencing the textured model, and retexturing the georeferenced mesh with imagery from other cameras using camera position and alignment derived from visible image matching.

Finally, images are aligned and processed for comparison (e.g. day over day) by first, ensuring equivalent exposure and contrast over long periods of time in different lighting conditions and second, warping, and aligning full-sized maps and subregions of interest to a predetermined reference map.

An example implementation of alignment and registration workflow can use, for example, canny edge detection and phase correlation to register the translational offsets between individual images from different cameras; HAHOG (Hessian-Affine and Histogram Of Gradients) for feature extraction and description of visible spectrum images; FLANN (Fast Library for Approximate Nearest Neighbors) Matcher for feature matching using HAHOG descriptors; Multi-View Stereo Reconstruction for creation of point clouds from matched features; Poisson Surface Reconstruction for mesh generation from dense point clouds; Multi-View Stereo for mesh texturing/retexturing; Ground Control Points (GCPs) or GPS EXIF tags for georeferencing stitched maps; Gaussian histogram specification for consistency in day-to-day orthomap brightness and contrast; BRISK (Binary Robust Invariant Scalable Keypoints) keypoint descriptor for detection of features between stitched visible orthomaps and reference maps; Brute-Force feature matching using BRISK descriptors; Homography transformation generated from feature matches for day-to-day full-map/subregion alignment.

Analysis engine 106 is further configured as part of method 400 (not shown) to precisely align the two composite images generated from data collected at different times. In another embodiment without composite images, analysis engine 106 is configured to precisely align sets of individual, non-composite images.

In an embodiment, the composite images described herein exhibit particular stitching seamlines, and particular edge distortions due to the stitching. Stitched composite imagery as the base for detection can be identified by analysis of individual and composite image resolutions, sizes, and continuity.

Figure 6:
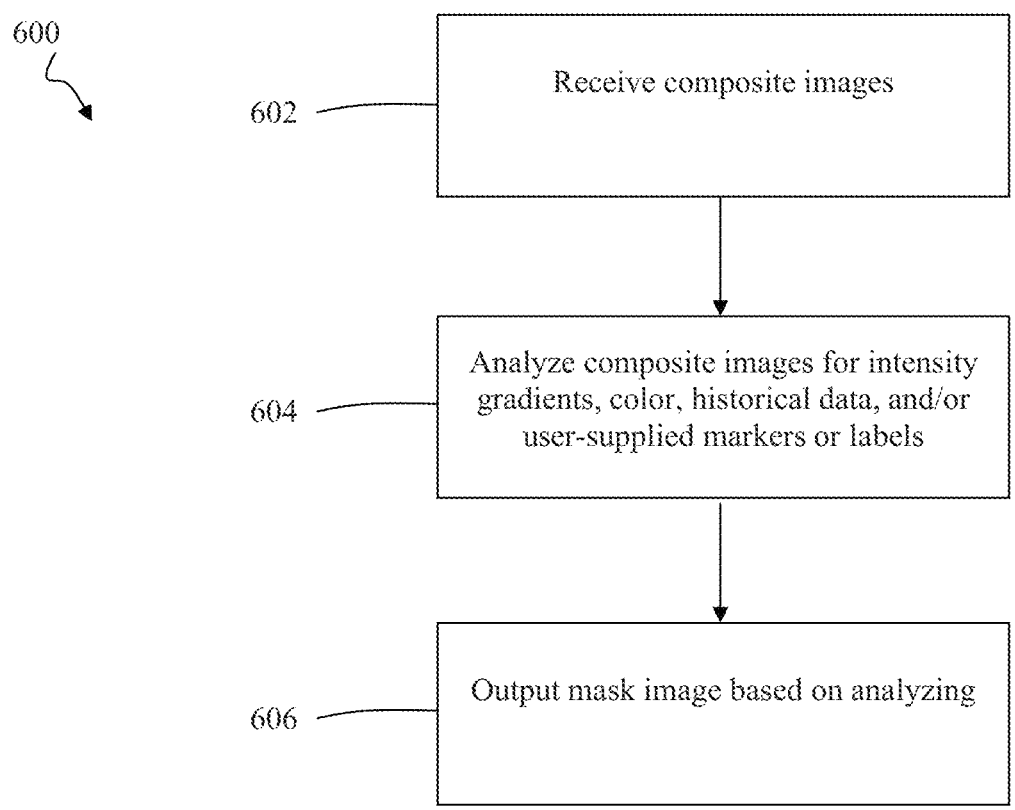
FIG. 6 is a flowchart of a sub-method for feature detection and segmentation, according to an embodiment.
Figure 7:
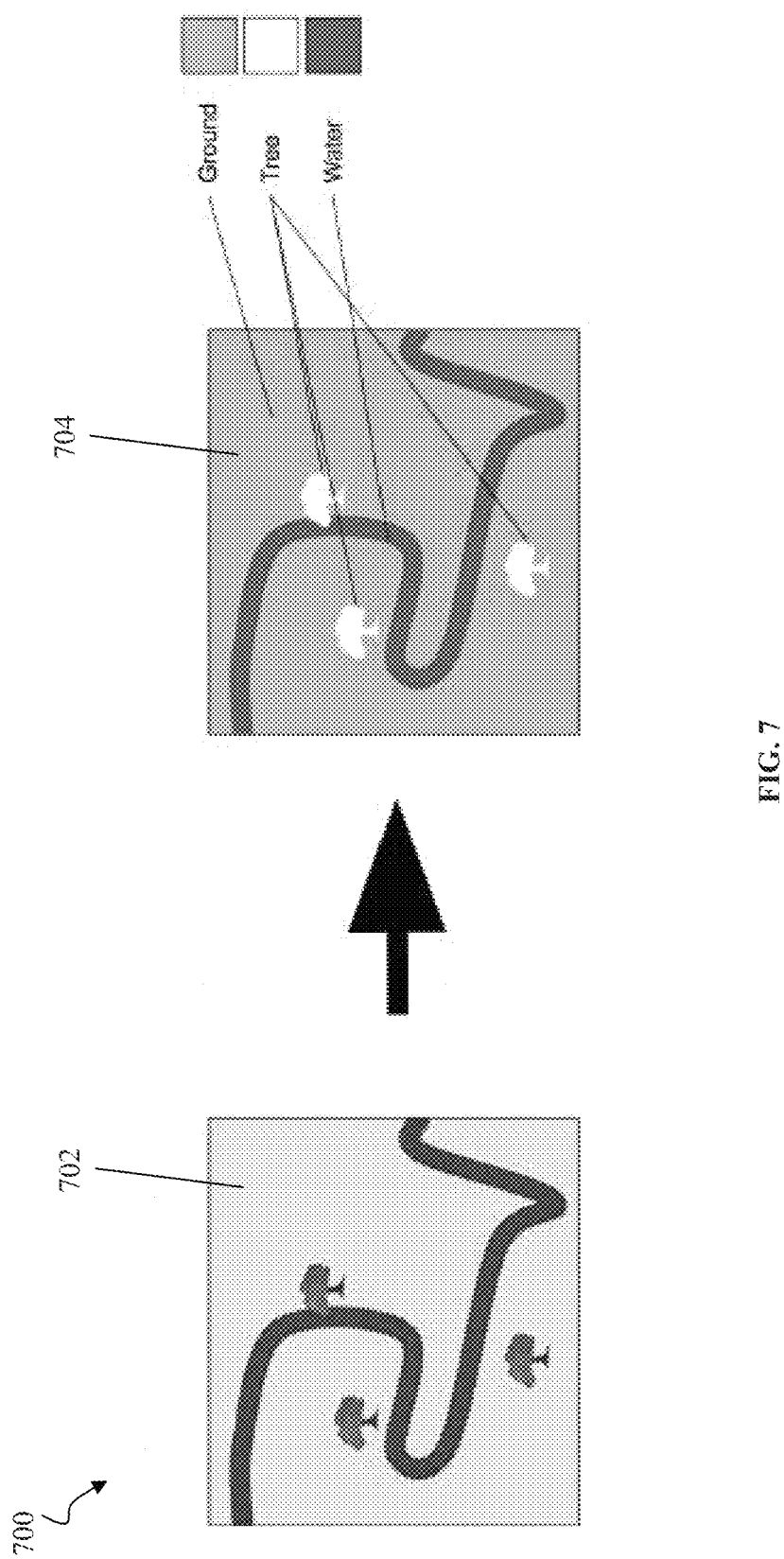
FIG. 7 is a block diagram illustration of a segmentation mask using the sub-method of FIG. 6, according to an embodiment.

Referring to FIG. 6, a flowchart of a sub-method 600 for feature detection and segmentation is depicted, according to an embodiment. For example, analysis engine 106 is configured to identify and label features or regions of interest in the composite images. In embodiments, analysis engine 106 can analyze intensity gradients, color, historical data, and/or user supplied markers or feature labels.

In particular, sub-method 400 generally comprises first retrieving the composite images. In an embodiment if alignment and registration sub-method 400 and detection and segmentation sub-method 600 are being executed serially, analysis engine 106 can use the locally stored copies of the composite images. However, if alignment and registration sub-method 400 and detection and segmentation sub-method 600 are being executed relatively distal each other in time without locally stored copies, analysis engine 106 can first retrieve the composite images from data storage 104.

At 604, at least one composite image is analyzed for intensity gradients, color, historical data, and/or user-supplied markers or labels. In an embodiment, a plurality of composite images can be analyzed to increase the number and accuracy of the features or regions of interest that are found.

At 606, an output image can be output. In an embodiment, the result of the segmentation is a "mask" image that can be used to determine which pixels in the original image belong to which features). For example, referring to FIG. 7, a block diagram illustration 700 of a resulting segmentation mask using sub-method 600 is depicted, according to an embodiment. In an embodiment, composite image 702 is analyzed to generate masked image 704. Accordingly, ground, trees, and water can be detected based on, for example, the differences in intensities between images.

In embodiments, system 100 is further configured to detect changes between any pair of precisely aligned images with multiple detection modes. For example, referring to FIG. 8A, a flowchart of a first sub-method detection mode 800 for change detection is depicted, according to an embodiment. The precisely aligned images can be, for example, the composite images created by method 400. As described above, the pair of composite images typically depicts a parcel of land at a first time and the parcel of land at a later second time. In certain embodiments, the detection modes described herein can be utilized not just on a pair of images, but on three or more images representing three time (or more) periods. In such an embodiment, sub-method 600 can be skipped.

At 802, differences in average intensity between two images are calculated. In an embodiment, average intensity can be calculated pixel-by-pixel. In another embodiment, a moving window calculates difference in average intensity between two images as the window moves along the images.

At 804, the average intensity value differences are compared against a threshold value. In a moving window embodiment, any time the window determines that a given area is above a threshold in average intensity difference, a change is marked at 806. Similarly, individual pixels or areas proximate the features or regions of interest can be compared by the moving window parsing through particular areas. Thus, the window size and location can be adjusted. In embodiments, the average intensity comparison further accounts for any distortions created during the composite image generation.

Changes marked at 806 can be stored in data storage 104. In embodiments, the changes can form part of the metadata of the composite images.

Figure 8A:
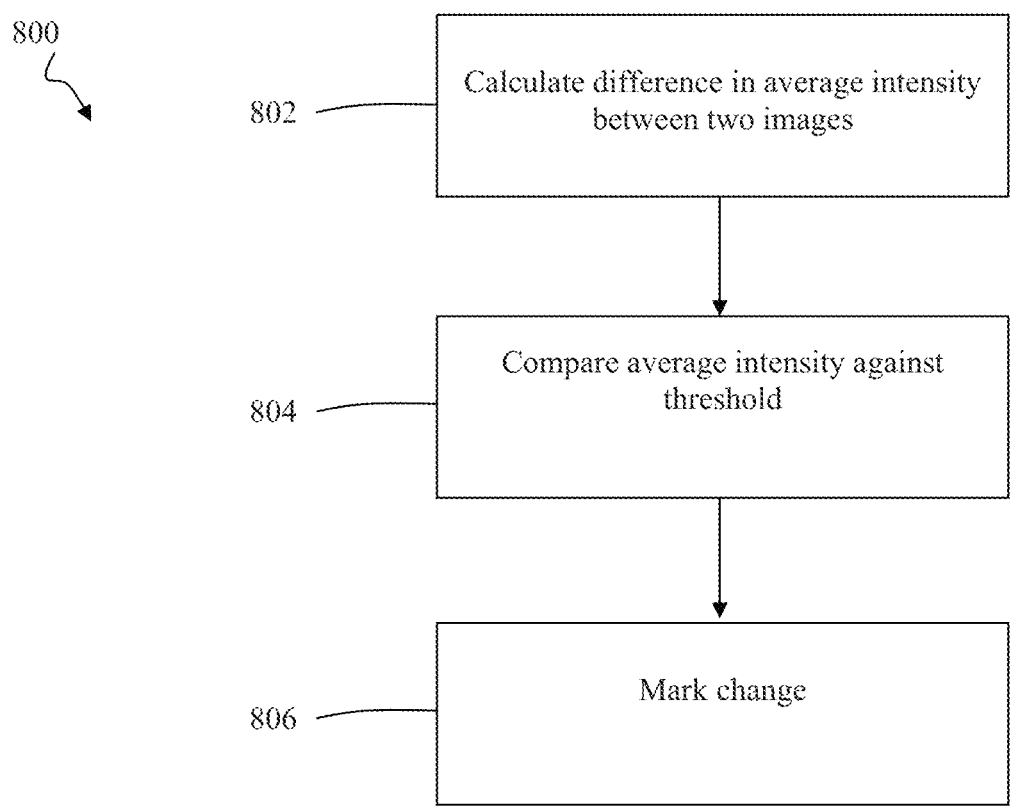
FIGS. 8A-8B are flowcharts of a sub-methods for change detection, according to embodiments.
Figure 8B:
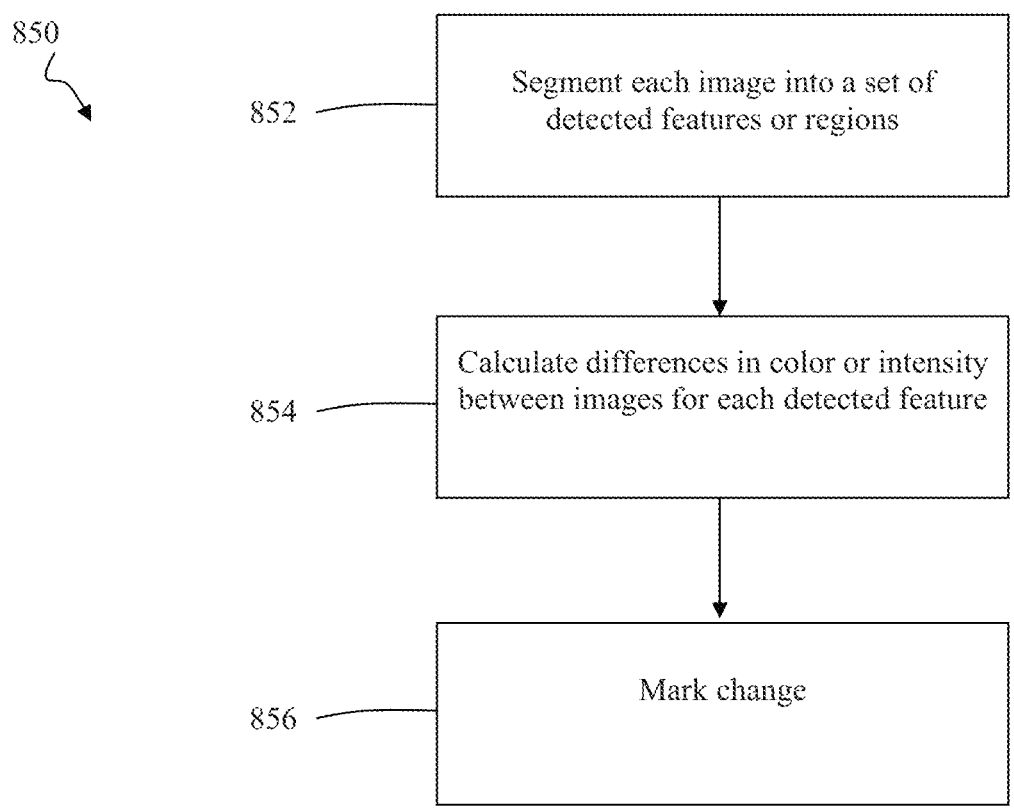

Referring to FIG. 8B, a flowchart of a second sub-method detection mode 850 for change detection is depicted, according to an embodiment. Sub-method detection mode 850 is a feature-based mode and can utilize predefined or ad-hoc generated areas of interest, or the features or regions of interest previously detected by, for example, sub-method 600.

For example, at 852, each image is segmented into a set of detected features or regions. In an embodiment, image segmentation can be sequentially by pixel or group of pixels, or similar to the segmentation in FIG. 6, At 854, the differences in color and/or intensity between images are calculated for each detected feature or region. If the differences in color and/or intensity are above a certain threshold, a change is marked at 856. In embodiments, the color or intensity comparison further accounts for any distortions created during the composite image generation.

Figure 9:
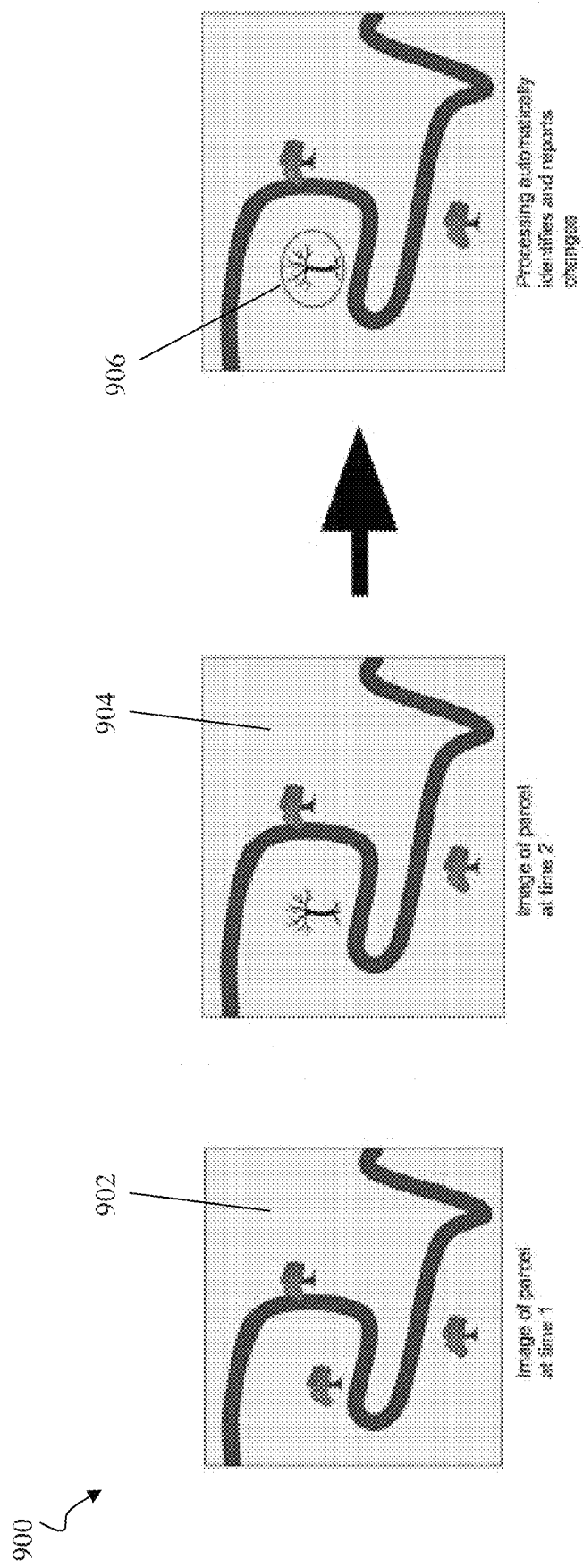
FIG. 9 is a block diagram illustration of images with changes detected using the sub-method of FIG. 8A or 8B, according to an embodiment.

For example, referring to FIG. 9, a block diagram illustration 900 of images with changes detected using sub-methods 800 or 850 is depicted, according to an embodiment. First composite image 902 at time 1 is compared to second composite image 904 at time 2 to detect changes, such as tree 906.

Figure 10:
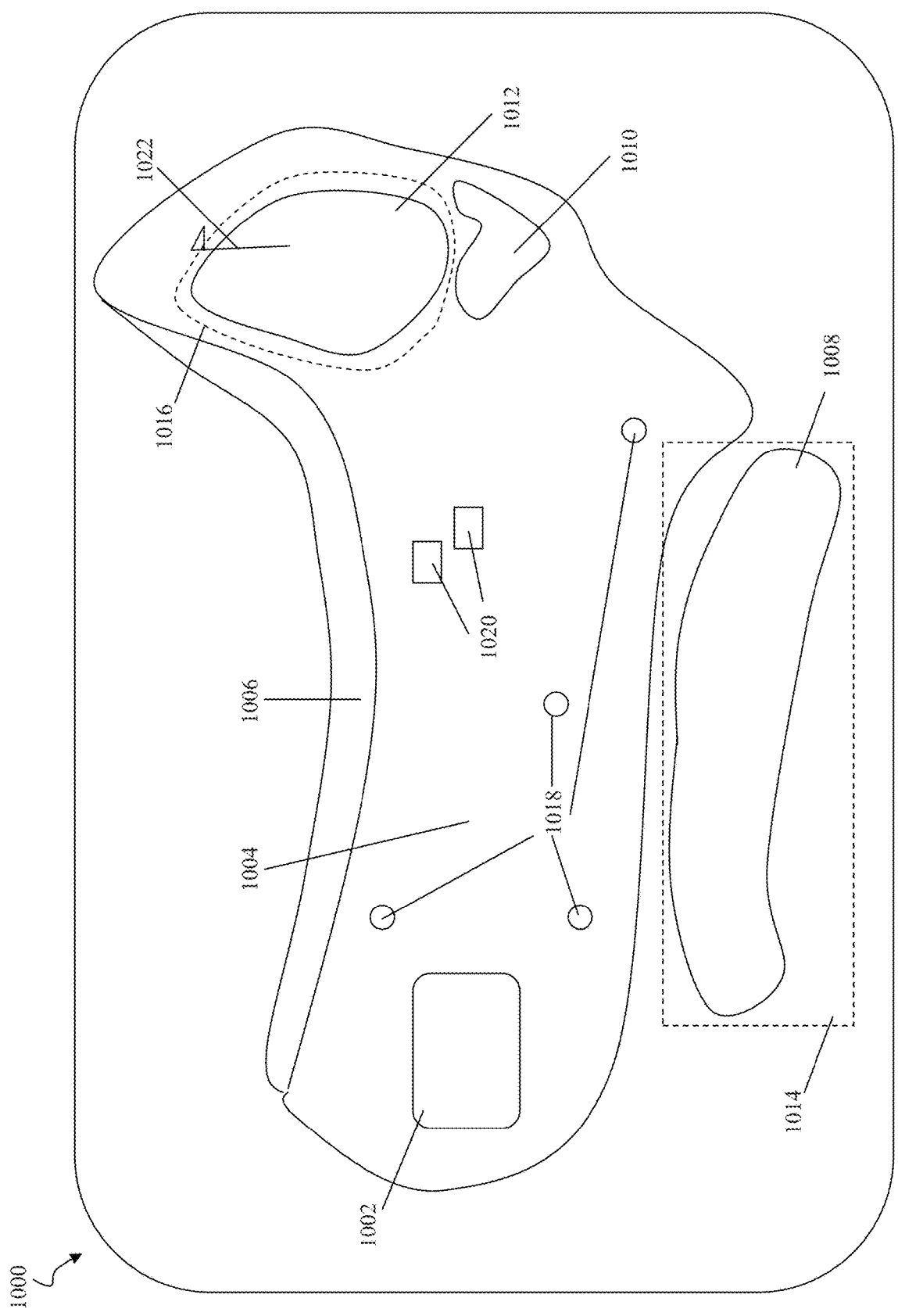
FIG. 10 is an illustration of a golf hole agricultural area on a graphical user interface, according to an embodiment.

In an embodiment, referring to FIG. 10, an illustration of a golf hole agricultural area 1000 on a graphical user interface is depicted, according to an embodiment. For ease of explanation, golf hole agricultural area 1000 is depicted with a number of objects that can be filtered out, as will be described.

Golf hole agricultural area 1000 comprises a section of a golf course having various features or sections, each of which can be selected for varying levels of analysis. In embodiments, the user interface can be presented in a pre-processing step by analysis engine 106 prior to execution of method 202.

For example, golf hole agricultural area 1000 comprises a plurality of selectable regions. In an embodiment, golf hole agricultural area 1000 comprises a tee box region 1002, a fairway region 1004, a rough region 1006, a water hazard region 1008, a sand trap region 1010, and a green region 1012.

Embodiments provide user-selectable or pre-defined areas that can be selected out of the image analysis, thereby increasing efficiency of the overall system. For example, a user can highlight or select selection 1014, which can encompass the water hazard region 1008. In certain embodiments, golf course attendants are not as interested in changes to water hazards as they are to the surrounding vegetation. Thus, a user can utilize the specialized user interface to exclude water hazard region 1008 from the change analysis determination. Similarly, a user may select sand trap region 1010 for exclusion (not shown for ease of illustration). As illustrated, region selection can be in varying levels of accuracy, such as the boxed selection of 1014, or the pinpoint selection of 1016. Embodiments can also use user interface inputs to more particularly analyze, then self-select, regions the user points at or clicks on.

In other embodiments, a user can highlight or select areas for a particular resolution of analysis. For example, a user can select selection 1016, which can encompass green region 1012. Because the greens are typically of high importance, the user can select green region 1012 to be at the highest level of change detection. Likewise, the user can select tee box region 1002 to be at a relatively high level of change detection. A user can select rough region 1006 to be at a relatively low level of change detection. A user can select fairway region to be at a medium level of change detection.

As a result, change detection is improved by excluding areas golf course areas such as the rough, water hazards, and sand traps. Further, important areas can be analyzed at a higher level than less important areas (e.g. greens and ground-under-repair compared to out-of-bounds). Further, pre-defined, or selectively set regions can vary the resolution of change detection in those areas.

In embodiments, an initial set of pre-defined regions is made, and embodiments provide for further adjustment of those regions. In an embodiment, a user can adjust the initial set of pre-defined regions. In another embodiment, machine learning trained data sets can adjust the initial set of pre-defined regions. In another embodiment, temporal and environmental considerations are factored in (as will be described) resulting in an automatic adjustment of the pre-defined regions.

In embodiments, golf hole agricultural area 1000 further comprises various objects that can be filtered out as part of the aforementioned image processing techniques and algorithms to align imagery, compute differences, and detect which features have changed. Such filtering highlights the differences from crop solutions described in the Background section above.

As also mentioned above, golf courses present a unique challenge for change detection compared to agricultural crops because golf courses are a dynamic environment having continuous environmental and temporal movement by golfers, golf carts, and maintenance equipment, as well as various moving and stationary golf course artifacts like flags, tee box markers, yardage markers, irrigation heads, and the like. Accordingly, systems can ignore or filter for transient objects unique to a golf course environment. In an embodiment, pre-composite filters for golf carts or animals that move image-to-image on the same flight can be valuable. In most embodiments, image filtering post-composite generation can be valuable in presenting data to the user.

In an embodiment, pre-process filtering can identify known fixed objects. For example, as illustrated in FIG. 10, golf hole agricultural area 1000 can further comprise a plurality of sprinkler heads 1018. Fixed features sprinkler heads 1018 can be filtered out of consideration from the change detection process. Likewise, other known golf course artifacts like yardage markers and tee box benches can also be filtered out by comparison to a database of known objects, or pre-programmed locations.

Further, pre-process filtering can identify transient moving objects such as people, animals, and golf carts. For example, thermal signatures can be utilized to restrict out humans and animals from the change detection process. In FIG. 10, golf carts 1020 and flag 1022 (which can move week-to-week) can be identified as other objects to be removed.

In an embodiment, an object identification process analyzes successive image frames to determine a shape of an object within those frames, then compares the shape against known shapes unique to golf course environments. For example, a Doppler effect-type analysis can be used as the images are taken and the UAV, for example, moves towards or away from a given object, or as the given objects moves towards or away from the imaging UAV.

Such successive frame analysis for transient objects plainly would not be done with most crop imaging techniques. Thus, embodiments are configured to filter out "expected" or "normal" deviations such as transient (e.g. golf cart) or predetermined (rough, pond, sand trap) as described above.

Figure 11:
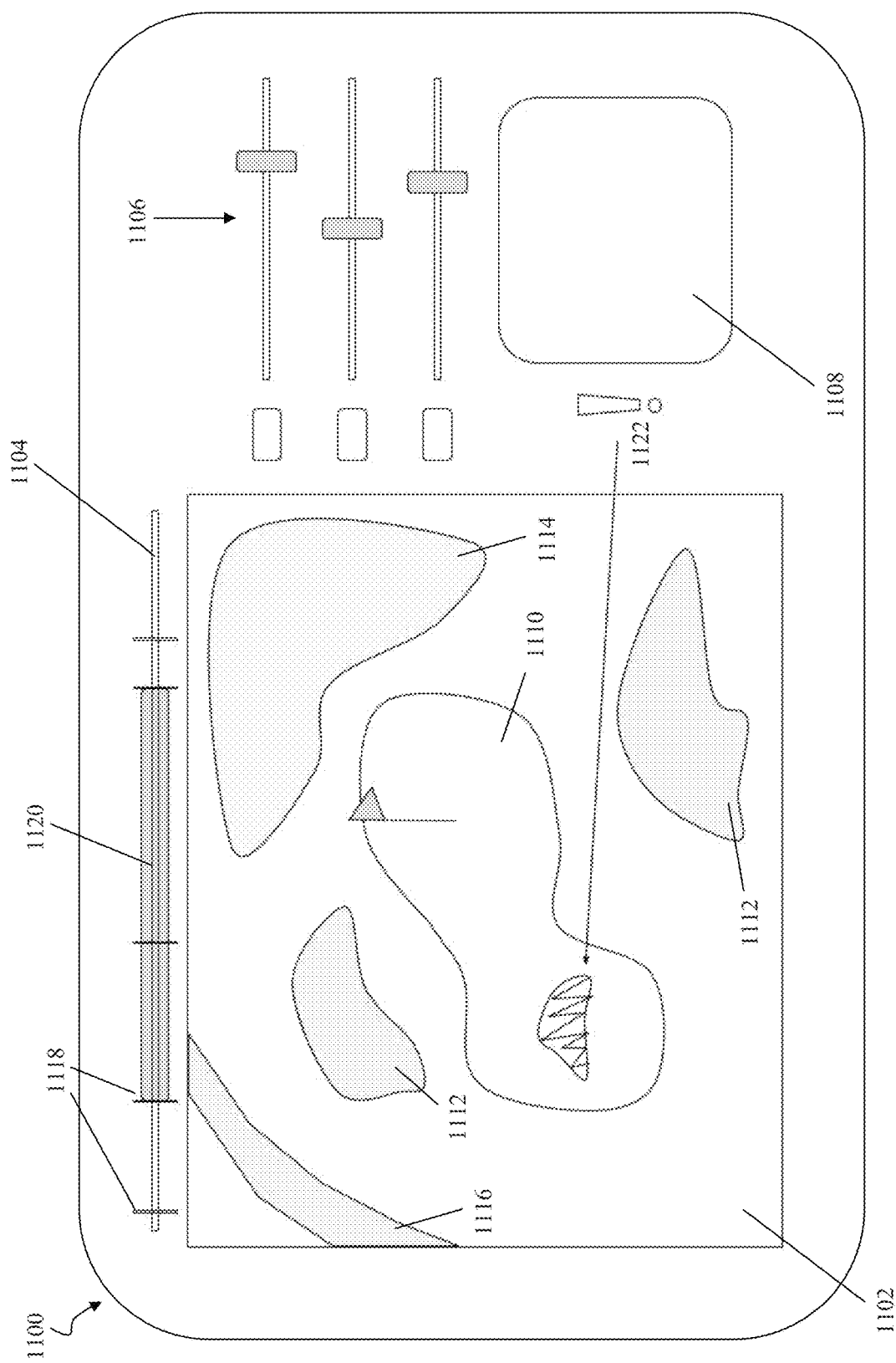
FIG. 11 is a block diagram illustration of a graphical user interface for a system for automated image change detection, according to an embodiment.

Referring to FIG. 11, a block diagram illustration of a graphical user interface 1100 for a system for automated image change detection is depicted, according to an embodiment. User interface 1100 generally comprises a main screen 1102, a timeline 1104, a plurality of adjustable thresholds 1106, and an alert region 1108.

User interface 1100 generally comprises main screen 1102 presenting a subregion of interest (here, a golf hole green 1110) and surrounding features. In embodiments, the subregion of interest can further comprise static or dynamic features (e.g. sandtraps 1112, water hazard 1114, and cart path 1116) to be filtered out from consideration for change detection thresholding. In embodiments, as described above with respect to FIG. 10, any of sandtraps 1112, water hazard 1114, or cart path 1116 can be selected by the user to be omitted from the change detection process. For example, a user can select various regions or be prompted for such regions as part of threshold adjustments 1106.

User interface 1100 further comprises timeline 1104. Timeline 1104 can comprise marks 1118 for each flight flown and a highlighted section showing a desired timespan 1120 for change detection. The user can adjust timespan 1120 to trigger change detection for images captured during the various different flights.

User interface 1100 further comprises plurality of adjustable thresholds 1106. As illustrated, adjustable thresholds 1106 comprises three slider bars reflecting the "adjustable thresholds" for change detection. Adjustable thresholds 1106 further comprises toggle buttons to activate/deactivate each threshold. In an embodiment, each slider is representative of the desired intensity threshold for visible, NDVI, and thermal bands, respectively. One skilled in the art will readily appreciate that additional or fewer slider bar/toggle button combinations can be utilized, depending on the type of images captured. Moreover, other adjustable user interface components can likewise be implemented and not depart from the scope of the invention.

User interface 1100 further comprises alert region 1108. In an embodiment, an alert region presents changes that have passed the chosen thresholds (in this example, perhaps some localized flooding 1122 on green 1110). Alert region 1108 can include text explaining the meaning of the detected change or suggested courses of action to take to remedy the issue.

Thus, user interfaces are directed to an improved user interface for computing devices. The amount of data captured (and processed) by UAVs described herein can be quite large. The interfaces described and pictured herein are directed to a particular manner of summarizing and presenting information in electronic devices for meaningful distillation of the data collected and processed.

For example, main screen 1102 presents a subregion of interest from all of the images taken (or where appropriate, composite images). More particularly, subregions of interest can be automatically determined based on the imaging application (e.g. golf course, vineyard, etc.). For example, all tee boxes and all greens might be pre-selected for a golf course application. In another embodiment, subregions of interest are determined by the objects detected within the images taken. In another embodiment, subregions of interest are manually selected for future presentation by the user.

In another example, timeline 1104 narrows the presented subregion of interest according to relative flights flown. In another example, alert region 1108 further narrows the display to a particular area passing the boundaries set by adjustable thresholds 1106. These features disclose a specific manner of displaying a limited set of information to the user, rather than using conventional user interface methods to generically "display" changes on a computer. Moreover, prior art interfaces do not provide the tailored change display described herein, forcing users to search through the large sets of data taken by the imaging devices without context, or bounding of the changes detected.

Thus, embodiments improve the efficiency of using electronic devices by displaying selected subregions of interest according to, for example, a timeline, and an adjustable threshold. Displaying selected data or areas of interest in the main summary window allows the user to see the most relevant data in an economical and useful way. The speed of the user's navigation through the detected changes is improved because embodiments save the user from having to parse through all of the image data.

Moreover, the processing of images is improved by the exclusion of static and dynamic objects from certain images. Instead of having to process all image data as in the prior art, certain regions, or objects are excluded. When taken over large the volumes of data captured by aerial imagers, these exclusions result in meaningful processing savings.

In other embodiments, the systems and methods described herein can be utilized for solar panels in solar fields. Typically, human solar field monitors must manually walk through the solar fields and take pictures with hand-held thermal cameras. Embodiments are therefore able to capture solar panel degradation over time by identifying changes in particular panels.

In another embodiment, the systems and methods described herein can be utilized for vineyards or orchards. For example, the changes in grapes or other crops can be monitored and changes likewise detected.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting changes in an agricultural area, the system comprising:
   a remote imaging device configured to capture and store data related to the agricultural area in a first multiplicity of images of a land parcel captured during a first time period and a second multiplicity of images of the same land parcel captured during a second time period;
   an analysis engine comprising instructions that, when implemented by a processor operably coupled to memory, cause the processor to:
      access and compile the first multiplicity of images into a first composite image of the land parcel for the first time period,
      access and compile the second multiplicity of images into a second composite image of the land parcel for the second time period, and
      detect at least one change between the first composite image and the second composite image with a moving set of windows that calculates differences in intensity between the first composite image and the second composite image for a common area of the land parcel represented by each of the moving set of windows and compares the differences in intensity for each of the moving set of windows against a threshold value; and
   a display engine comprising instructions that, when implemented by a processor operably coupled to memory, cause the processor to:
      generate an interactive overlay user interface that presents the at least one change as a difference in images of the land parcel between the first time period and the second time period, wherein the interactive overlay comprises at least one adjustable threshold user interface element allowing a user to adjust a magnitude of the at least one change displayed.

2. The system of claim 1, wherein at least two of the images of the first multiplicity of images are partially overlapped with each other and the analysis engine is further configured to align the overlapped images when compiling the first composite image.

3. The system of claim 1, wherein at least two of the images of the first multiplicity of images are taken by the remote imaging device at different angles.

4. The system of claim 1, wherein at least two of the images of the first multiplicity of images are taken by the remote imaging device at different altitudes.

5. The system of claim 1, wherein the analysis engine is further configured to detect the at least one change between the first composite image and the second composite image by detecting a plurality of features in the first composite image and the second composite image by generating a segmentation mask image.

6. The system of claim 5, wherein the analysis engine is further configured to detect the at least one change between the first composite image and the second composite image by using the segmentation mask image to segment the first composite image and the second composite image into a plurality of detected features and calculate differences in intensity for each detected feature.

7. The system of claim 1, wherein the remote imaging device is positioned on an unmanned aerial vehicle (UAV).

8. The system of claim 7, further comprising a UAV controller, wherein the UAV controller is configured to command the remote imaging device to image the agricultural area at least twice per week.

9. The system of claim 7, further comprising a UAV controller, wherein the UAV controller is configured to:
   command the remote imaging device to image the agricultural area at a high altitude;
   detect a sensor trigger; and
   in response to detecting the sensor trigger, command the remote imaging device to image the agricultural area at a low altitude.

10. A method for detecting changes in an agricultural area, the method comprising:
   capturing data related to the agricultural area using a remote imaging device by acquiring a first multiplicity of images of a land parcel captured at a first time period and a second multiplicity of images of the same land parcel captured at a second time period;
   storing in data storage, the first multiplicity of image, and the second multiplicity of images;
   compiling the first multiplicity of images into a first composite image;
   compiling the second multiplicity of images into a second composite image, and
   detecting at least one change between the first composite image and the second composite image with a moving set of windows that calculates differences in intensity between the first composite image and the second composite image for a common area of the land parcel represented by each of the moving set of windows and compares the differences in intensity for each of the moving set of windows against a threshold value; and
   generating an interactive overlay user interface that presents the at least one change as a difference in images of the land parcel between the first time period and the second time period, wherein the interactive overlay comprises at least one adjustable threshold user interface element allowing a user to adjust a magnitude of the at least one change displayed.

11. The method of claim 10, wherein at least two of the images of the first multiplicity of images are partially overlapped with each other and the method further comprises:
   aligning the first image with the second image when compiling the first image and the second image.

12. The method of claim 10, further comprising detecting a plurality of features in the first composite image and the second composite image by generating a segmentation mask image.

13. The method of claim 12, wherein detecting the at least one change between the first composite image and the second composite image further comprises using the segmentation mask image to segment the first composite image and the second composite image into a plurality of detected features and calculate differences in intensity for each detected feature.

14. The method of claim 10, further comprising positioning the remote imaging device on an unmanned aerial vehicle (UAV).

15. The method of claim 14, further comprising presenting a UAV controller configured to command the remote imaging device to image the agricultural area at least twice per week.

16. The method of claim 14, further comprising presenting a UAV controller configured to:
   command the remote imaging device to image the agricultural area at a high altitude;
   detect a sensor trigger; and
   in response to detecting the sensor trigger, command the remote imaging device to image the agricultural area at a low altitude.

* * * * *